(12) United States Patent
Young et al.

(10) Patent No.: US 9,389,705 B2
(45) Date of Patent: Jul. 12, 2016

(54) MOUSE USER INTERFACE WITH CONFIGURABLE COMPONENTS

(71) Applicant: MAD CATZ INTERACTIVE, INC., San Diego, CA (US)

(72) Inventors: Andrew Brian Young, Oakdale (GB); Robert Ian Hall, Bristol (GB)

(73) Assignee: MAD CATZ INTERACTIVE, INC., San Diego, CA (US)

(*) Notice: Subject to any disclaimer, the term of this patent is extended or adjusted under 35 U.S.C. 154(b) by 21 days.

(21) Appl. No.: 14/546,270

(22) Filed: Nov. 18, 2014

(65) Prior Publication Data

US 2015/0138093 A1    May 21, 2015

Related U.S. Application Data

(60) Provisional application No. 61/906,304, filed on Nov. 19, 2013, provisional application No. 62/056,394, filed on Sep. 26, 2014.

(51) Int. Cl.
*G06F 3/0354*    (2013.01)
*G06F 3/03*    (2006.01)

(52) U.S. Cl.
CPC .......... *G06F 3/03543* (2013.01); *G06F 3/0312* (2013.01); *G06F 2203/0332* (2013.01)

(58) Field of Classification Search
CPC ............. G06F 3/03543; G06F 3/0312; G06F 2203/0332
See application file for complete search history.

(56) References Cited

U.S. PATENT DOCUMENTS

| | | | |
|---|---|---|---|
| 2001/0028361 A1 | 10/2001 | Culver | |
| 2002/0140668 A1* | 10/2002 | Crawford | G06F 3/03549 345/156 |
| 2008/0129693 A1 | 6/2008 | Chen | |
| 2009/0122012 A1* | 5/2009 | Bohn | G06F 3/03543 345/163 |
| 2011/0227828 A1* | 9/2011 | Blandin | G06F 3/03543 345/163 |
| 2015/0109208 A1* | 4/2015 | Wang | G06F 3/03543 345/163 |
| 2015/0286296 A1* | 10/2015 | Wang | G06F 3/03543 345/163 |

FOREIGN PATENT DOCUMENTS

WO    01/88898 A1    11/2001

OTHER PUBLICATIONS

Form PCT/ISA/220, PCT/US14/66139, "Notification of Transmittal of the International Search Report and the Written Opinion of the International Searching Authority, or the Declaration", 1 page; Form PCT/ISA/210, PCT/US14/66139, "International Search Report ", 2 pages; Form PCT/ISA/237, PCT/US14/66139, "Written Opinion of the International Searching Authority", 4 pages; Search History, 2 pages. Date of Mailing Feb. 23, 2015.

* cited by examiner

*Primary Examiner* — Liliana Cerullo

(57) ABSTRACT

Features of a mouse configured to be used as an user interface with a computing device are described. The mouse may include an arm component, a body component coupled to a first part of the arm component, and a wheel component coupled to a second part of the arm component.

17 Claims, 21 Drawing Sheets

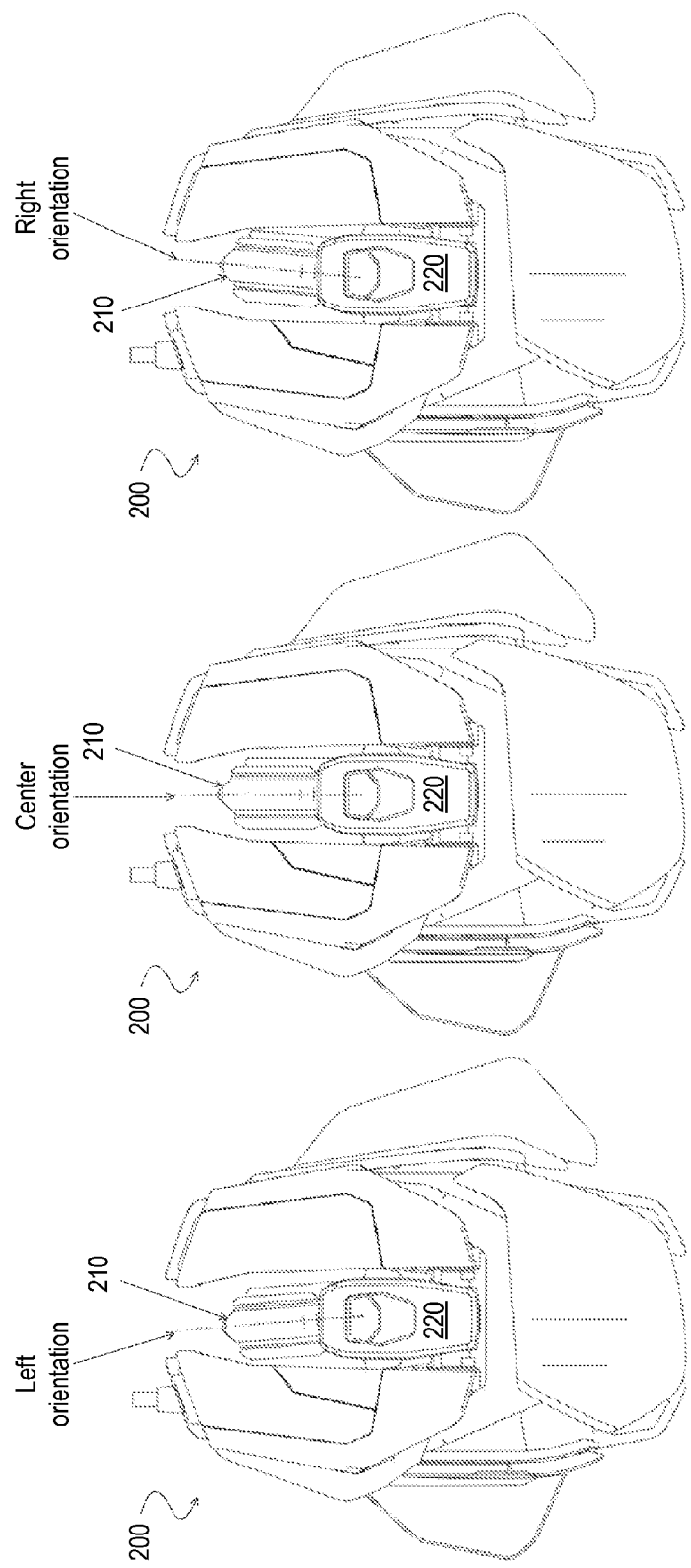

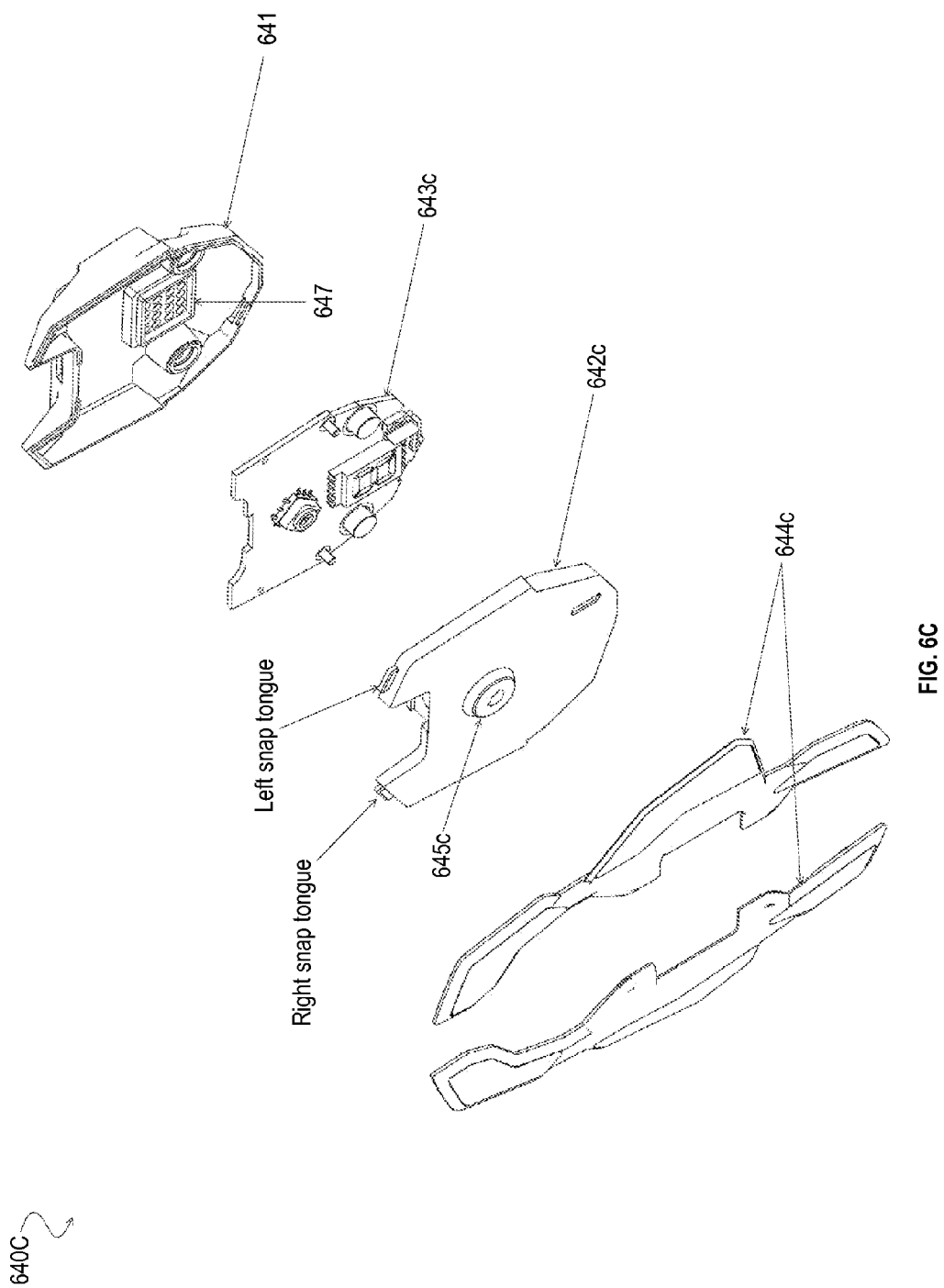

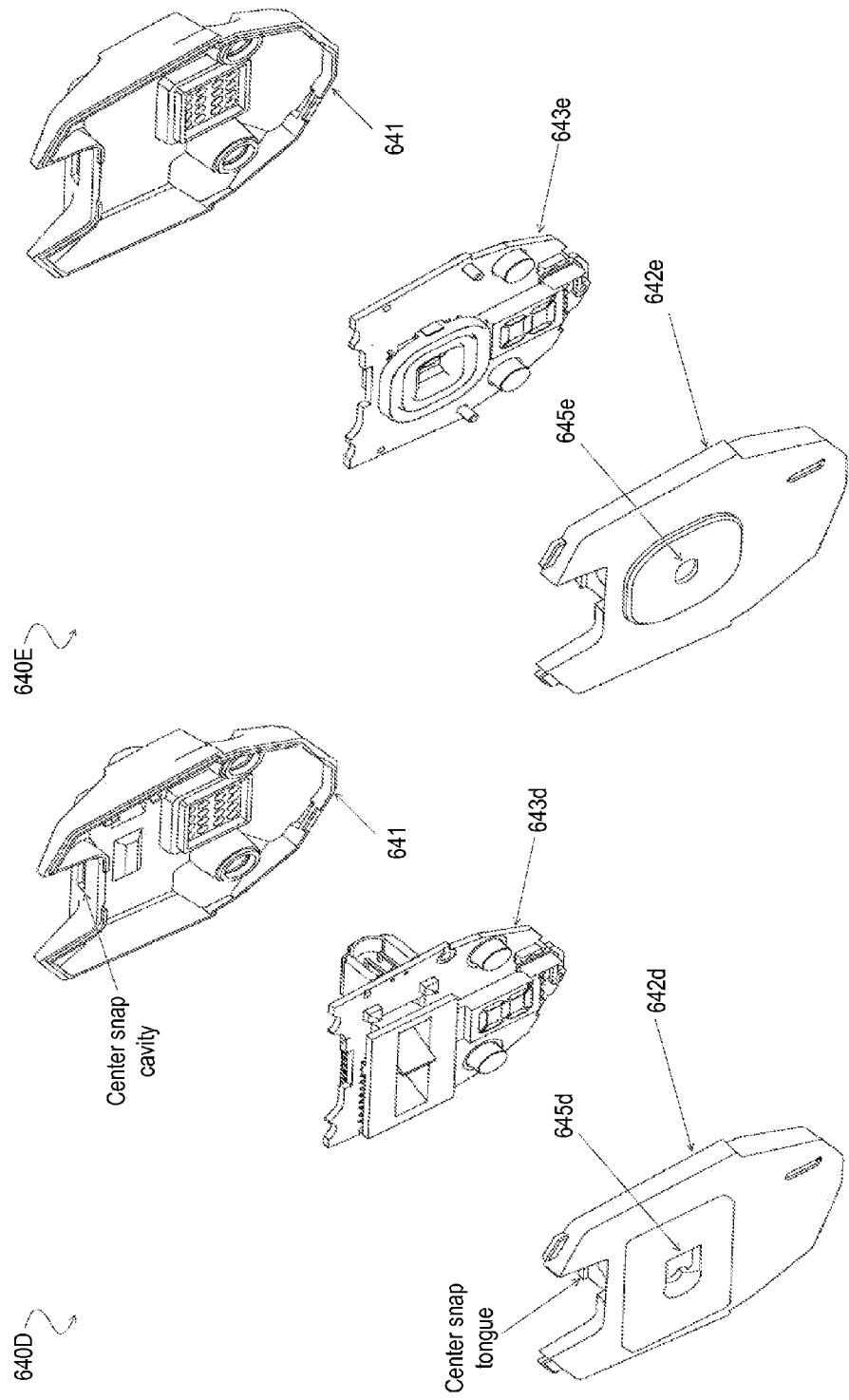

MOUSE USER INTERFACE WITH CONFIGURABLE COMPONENTS

RELATED APPLICATIONS

This application relates to U.S. Patent Application Ser. No. 61/906,304, filed Nov. 19, 2013, entitled COMPUTER/GAMING MOUSE WITH INTERCHANGEABLE DOCKING SENSOR COMPONENT, the content of which is hereby incorporated by reference herein in its entirety.

This application relates to U.S. Patent Application Ser. No. 62/056,394, filed Sep. 26, 2014, entitled COMPUTER/GAMING MOUSE WITH A STRAFING AND/OR REPLACEABLE SCROLL WHEEL COMPONENT, the content of which is hereby incorporated by reference herein in its entirety.

FIELD

Various embodiments relate to user interfaces for computers like mice, and more particularly, to mice with one or more components that enhance user experience.

BACKGROUND

Computer mouse interfaces are highly variable and may come in as many styles and features and diversification as automobiles. Gamers and long-term computer users are constantly trying to optimize how they interface with their computer systems. In many circumstances, a mouse is the primary interface between user and computer system.

Mice are highly individualized and often selected by a user based on a variety of features such as grip type, ergonomic design, texture, programmability, corded v. cordless, speed and sensor technologies. When selecting desired mouse features, a user is often forced to compromise by selecting one mouse that meets most of that user's preferences, or by purchasing several mice with different features. Unfortunately, the user cannot readily adapt a single mouse to fit their preferences for most or any situation. Fortunately, this disclosure describes various embodiments that resolve the above issues.

SUMMARY

Certain embodiments of this disclosure relate generally to a mouse configured to be used as a user interface with a computing device. Such a mouse may include an arm component, a body component coupled to a first part of the arm component, and a wheel component coupled to a second part of the arm component. The arm component may rotate about a first axis located where the first part of the arm component is coupled to the body component. The wheel component may rotate about a second axis located where wheel component is coupled to the first part of the arm component. The first axis may be perpendicular to or otherwise offset from the second axis. The wheel component may include a detachable wheel cover that may be detached after the arm component is moved about the first axis from one position to another position. The mouse may also include an adjustable palm rest and a lift component that assists a user in lifting the mouse during use. The details of various embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2A through FIG. 2C depict different positions of a wheel component of a mouse.

FIG. 6A through FIG. 6E depict detachable sensor components and a cavity of a mouse.

Like reference numbers and designations in the drawings indicate like elements.

DETAILED DESCRIPTION

Figure 1A:
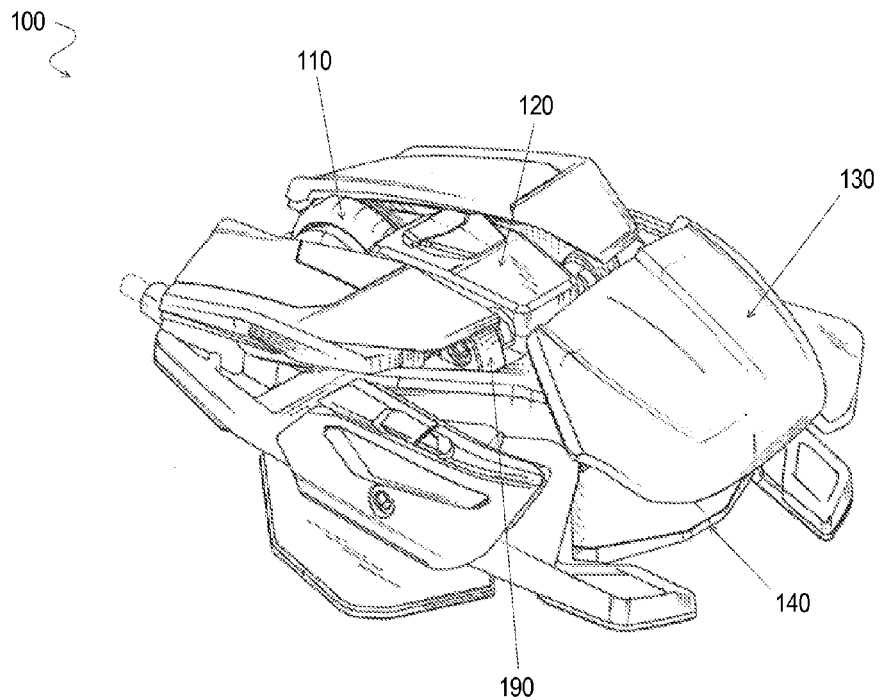
FIG. 1A through FIG. 1J depict views of a mouse with a wheel component, an arm component, a palm rest component, and a sensor component.
Figure 1B:
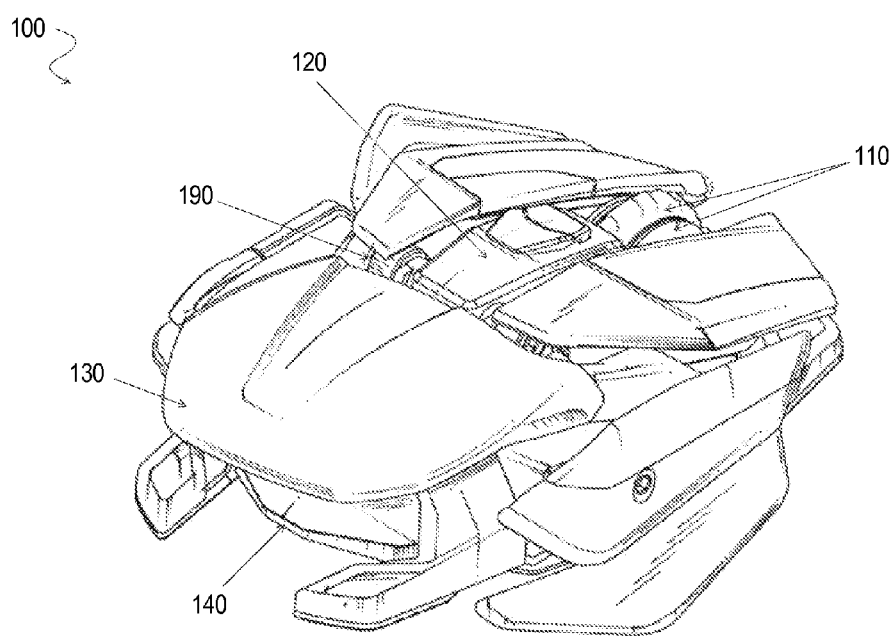
Figure 1C:
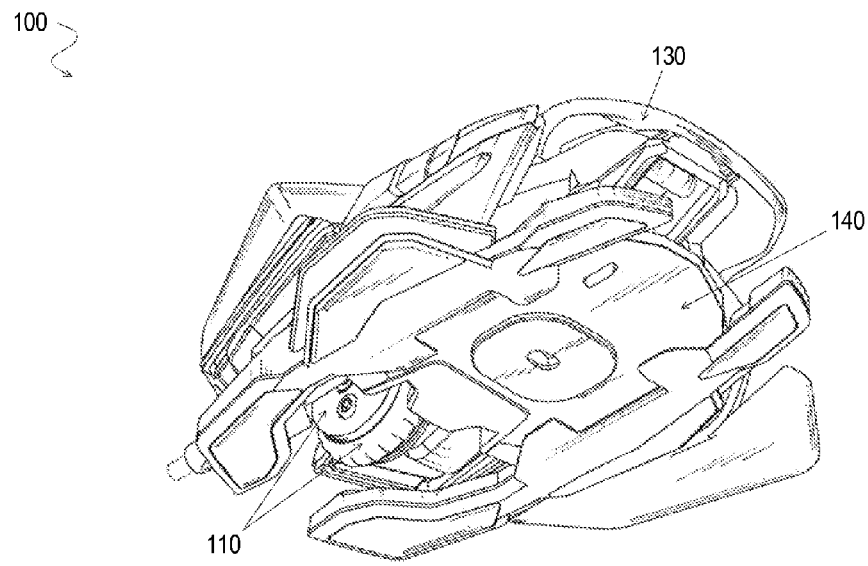
Figure 1D:
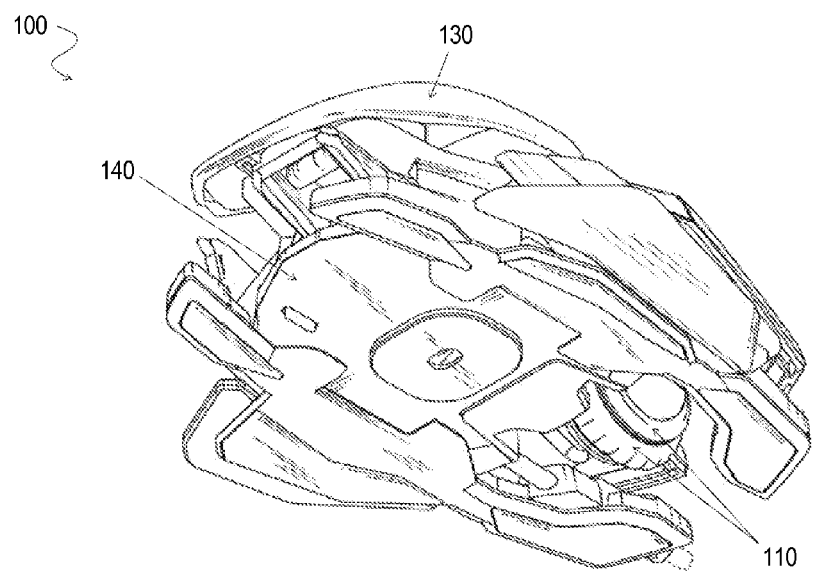
Figure 1F:
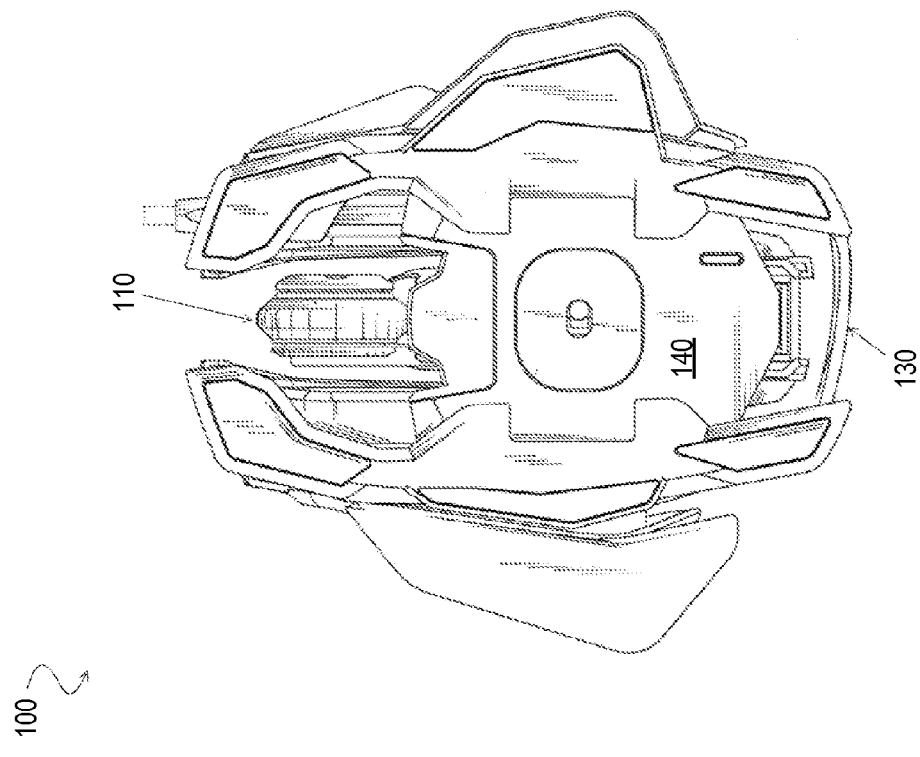
Figure 1E:
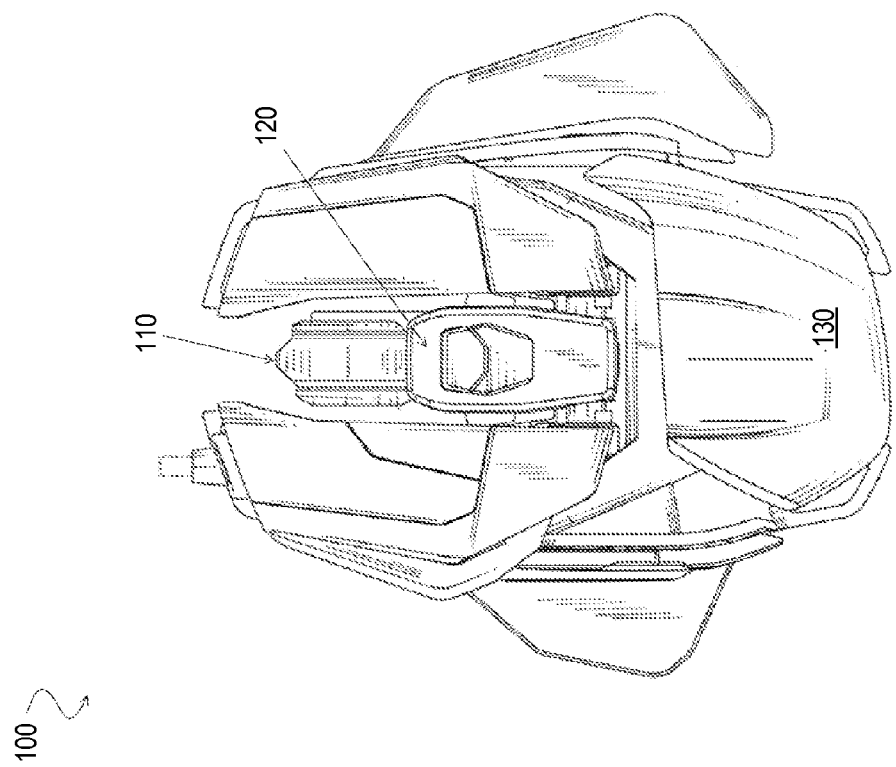
Figure 1G:
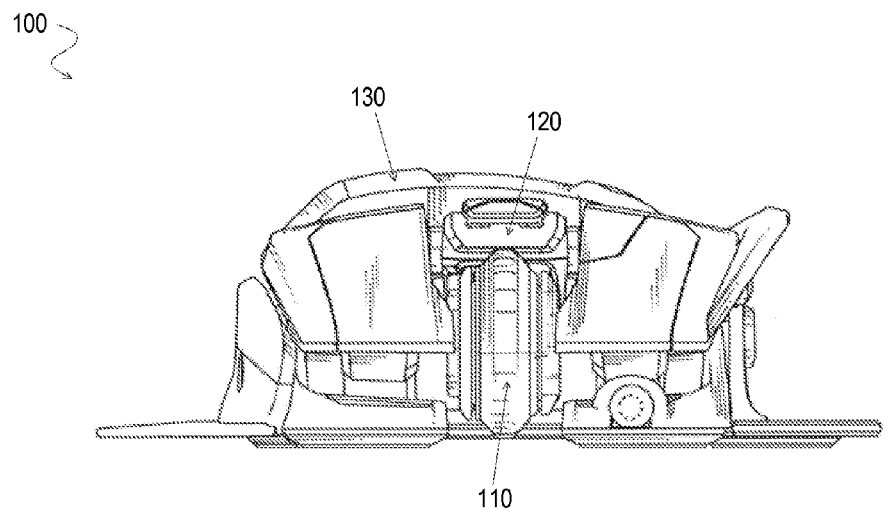
Figure 1H:
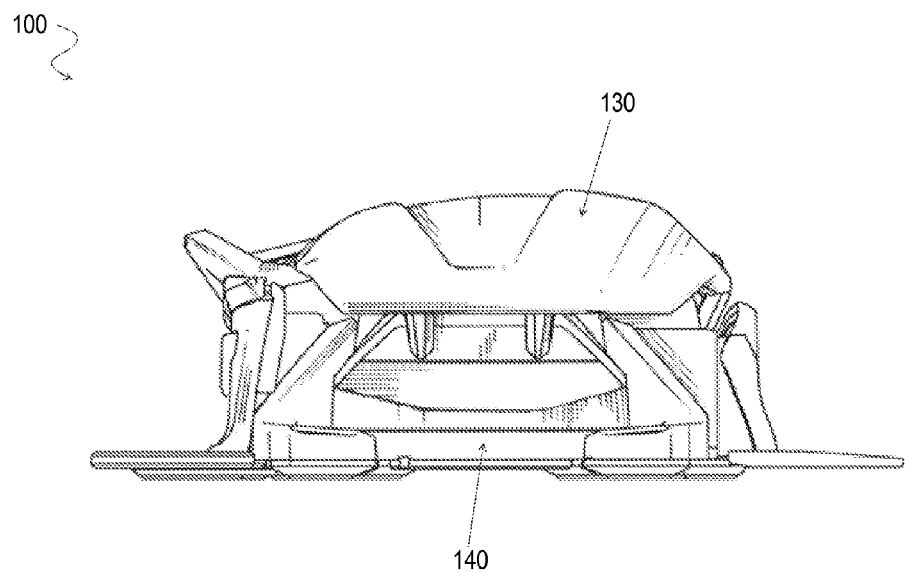
Figure 1I:
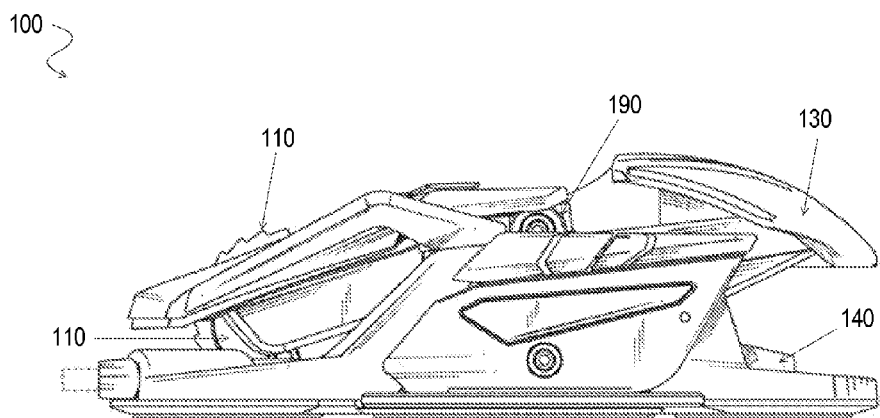
Figure 1J:
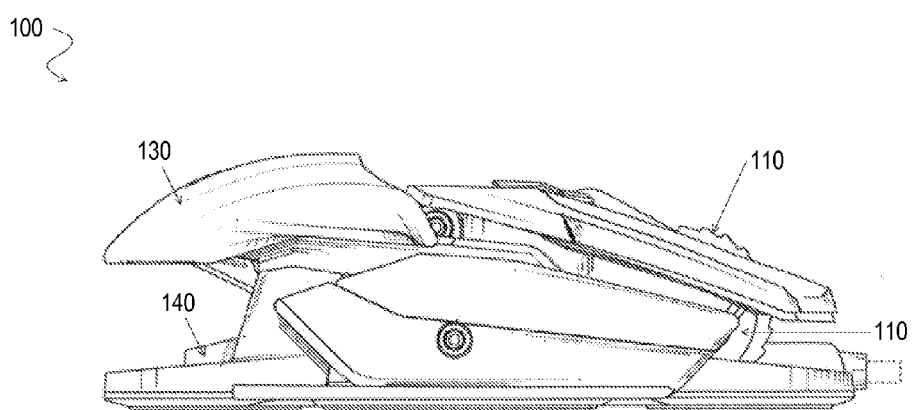

The disclosure relates generally to devices that enable a user to interface with a computer. Various embodiments are described below in relation to a mouse device (a "mouse" for short) with structural components that enhance user experience. Such structural components may include: a wheel component with various directional movements that can be used to receive user inputs; an adjustable arm component that enables a user to modify a wheel component; an adjustable palm rest component; a detachable sensor component; and a detachable or fixed lift component that improves a user's ability to lift the mouse during use. Each of the above structural components permits different users to configure and use the same mouse in a preferred manner.

In one embodiment, a "strafe" wheel component may be moved in a leftward and rightward direction by a user to control a character in a computer game or provide some other command that controls the operation of a computer application.

In another embodiment, an adjustable arm component may be moved to a position that permits a user to remove an existing wheel cover from a wheel component, and then add a new wheel cover to the wheel component. A user may wish to use a wheel cover with a different characteristic like surface texture, diameter, material or other characteristics known in the art.

In yet another embodiment, an adjustable arm component may be moved to a position that permits a user to change sensors for sensing rotational movement of a wheel barrel in a wheel component, or to modify rotational movement parameters of the wheel component. By way of example, a user may change how much rotation of a wheel barrel is necessary to create an input (e.g., how many clicks per revolution), or how much force is necessary to rotate a wheel barrel (e.g., to force detent). A user may also customize an alignment guide of the wheel component. Additionally, a user may modify the height of the wheel component relative to an upper surface of the mouse.

In another embodiment, an adjustable palm rest component may be adjusted to better fit a user's palm.

In yet another embodiment, a detachable sensor component may be removed from a docking cavity of a mouse, and a different sensor component may be inserted into the docking cavity. This allows a user to use different sensors that inter-relate trace movements of the mouse with different actions on a viewing console in different ways.

In another embodiment, a lift component may be attached to a mouse such that a user's finger or thumb is placed under the lift component, after which the finger or thumb can lift the mouse while contacting a surface of the lift component.

Mice described herein may also include customization buttons that a user can program to capture inputs that are translated as customized commands (e.g., character inputs, macros, modifications to sensor or wheel component parameters).

The above components are described in more detail below in relation to the figures.

Mouse

FIG. 1A through FIG. 1J depict views of a mouse 100. As shown, the mouse 100 includes various components, including a wheel component 110, an arm component 120, a palm rest component 130, a sensor component 140, and a base component 190. As shown, the wheel component 110 couples to the arm component 120, the arm component 120 couples to the base component 190, and the sensor component 140 is inserted into a docking cavity (not shown) of the mouse 100.

Different embodiments of the wheel component 110, the arm component 120, the palm rest component 130, and the sensor component 140 are depicted in other figures that are described below.

Wheel Component

FIG. 2A through FIG. 2C depict positions of a wheel component 210 of a mouse 200. As shown, the wheel component 210 articulates to a position along a left orientation (shown in FIG. 2A) from a center position along a center orientation (shown in FIG. 2B), and also articulates to a right position along a right orientation (shown in FIG. 2C) from the center position along the center orientation (shown in FIG. 2B).

The movement depicted by FIG. 2A through FIG. 2C is shown relative to an arm component 220 that does not articulate to the left and right orientations. In one embodiment, the left and right movement from a center position is made possible by a pivoting feature of the wheel component 210 and the arm component 220 that is positioned along a vertical axis. An example of such a pivoting feature is described later under the sub-heading 'Pivoting Feature' below. Movement about a vertical axis as shown is not found in existing wheel components.

Arm Component

Figure 3A:
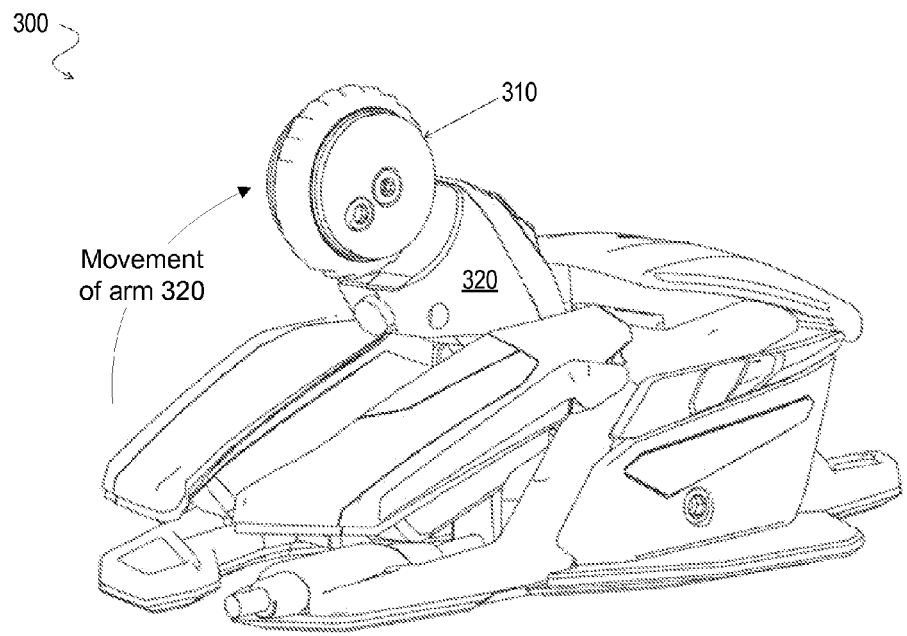
FIG. 3A depicts a moveable arm component of a mouse.

FIG. 3A depicts a moveable arm component 320 of a mouse 300. The moveable arm component 320 moves to its position shown in FIG. 3A from the position of the arm component 120 in FIG. 1A through FIG. 1J. As shown, the movable arm component 320 couples to a wheel component 310, which could be any of the wheel component 110, the articulating wheel component 210, or another wheel component. In one embodiment, the movement of the arm component 320 is made possible by a pivoting feature where the arm component 320 and a base component (not shown) couple to each other along a horizontal axis.

It is noted that movement of a wheel component (e.g., shown in FIG. 2A through FIG. 2C) and movement of an arm component (e.g., shown in FIG. 3A) may each or collectively be interpreted as user input. Such movement may be mapped as anything in a computer's character map (e.g., mouse clicks and media keys), mapped as an axis for movement (e.g., with values that typically range from 0-1024, where a center sprung movement pattern would have a center orientation at a value of 512), a macro key press (e.g., where a pre-programmed key sequence can be output like "do first thing, wait t seconds, then do second thing", or other mappings. Multiple different key presses could be programmed depending on how far the arm component and/or the wheel component are moved (e.g., 0 to 25% of total possible movement can result in a first input, 75% to 100% of total possible movement can result in a second input, and the zone between can result in no input, where each can be adjusted with software-related coding). Example uses of wheel component movements include: first person shooter (FPS) games (e.g., used to lean left or right to look around corners, to 'strafe' left or right while moving); role play games (RPGs) (e.g., used to scroll through a list of inventory); media mode (e.g., used as a volume wheel or a jog wheel to skip forward/backward); office mode (e.g., used as a horizontal scroll function). Example uses of arm component movements include: first person shooter (FPS) games (e.g., used to crouch or jump); role play games (RPGs) (e.g., used to navigate among different menu options); media mode (e.g., used as a playback speed control); office mode (e.g., used as a vertical control function).

Figure 3B:
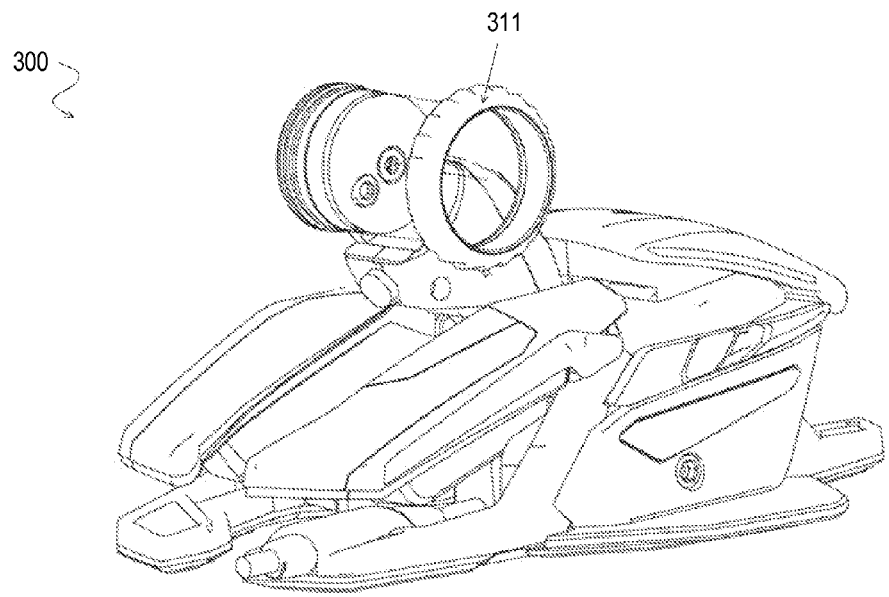
FIG. 3B depicts a detachable wheel cover.

FIG. 3B depicts a detachable wheel cover 311 of the wheel component 310, which may be removed and replaced by another type of wheel cover with different characteristics (e.g., surface texture like smooth, with ridges, or other texture; color; material like metal, plastic, non-slip rubber, or other material; different thickness that increases or decreases outer diameters; different widths, or other characteristics). The wheel cover 311 may be held in place by a frictional force or any other means known in the art.

Figure 4A:
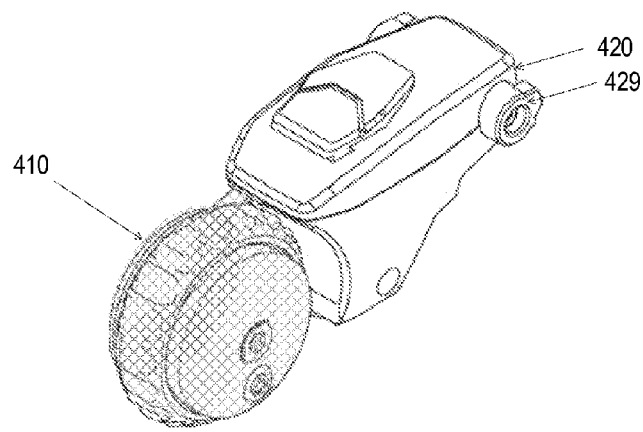
FIG. 4A depicts a detachable arm component coupled to a wheel component.

FIG. 4A depicts a detachable arm component 420 coupled to a wheel component 410. The outer portion of the wheel component 410 is designated by cross hatching. It is noted that the wheel component 410 and the arm component 420 may be integrated to form a single component or may be separate components that couple to each other. A connection point 429 of the arm component 420 is also shown. In one embodiment, the connection point 429 couples to a base component (not shown) that permits movement of the arm component 420 like that shown in relation to the arm components of FIG. 1A through FIG. 1J and FIG. 3A.

Figure 4B:
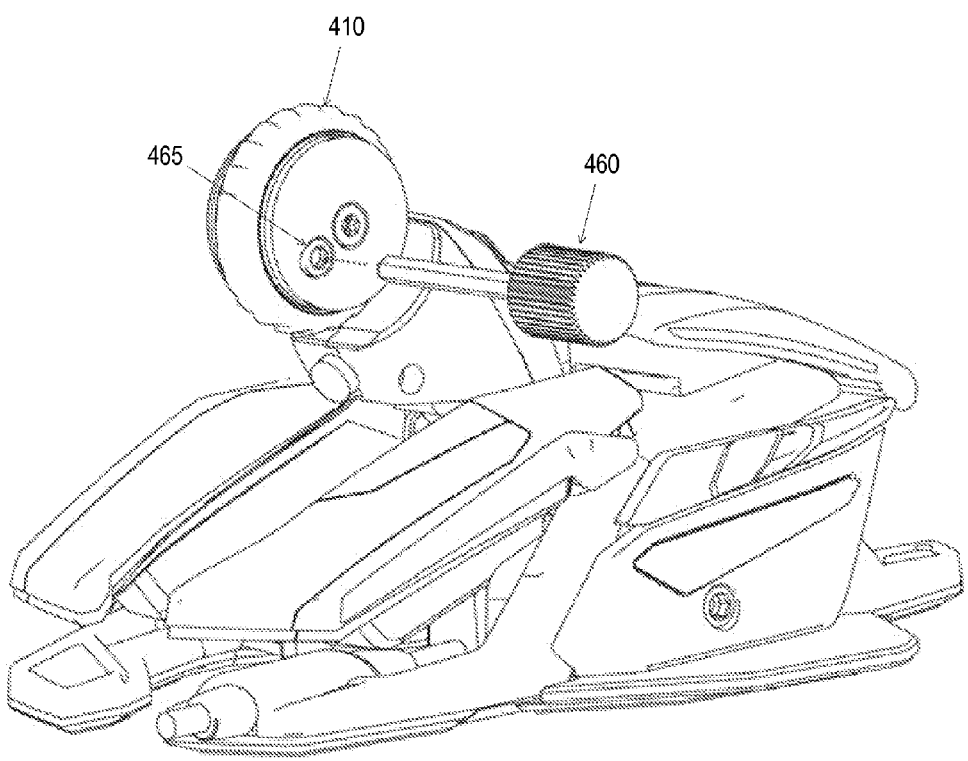
FIG. 4B depicts a tool for adjusting parameters of a wheel component.

FIG. 4B depicts a tool 460 for adjusting rotational parameters of a wheel. As shown, the tool 460 (e.g., a key or wrench) can be inserted into a dial 465 that adjusts the rotational parameters. The tool 460 may mechanically operate on the dial, which modifies rotational parameters. In one embodiment, the tool 460 is a key that increases or decreases (e.g., to zero) the actuation force required to rotate wheel barrel (e.g., using two angled pieces of plastic at 45 degrees to each other, which in turn press a small ball bearing which runs up and down indents of a wheel barrel).

Figure 4C:
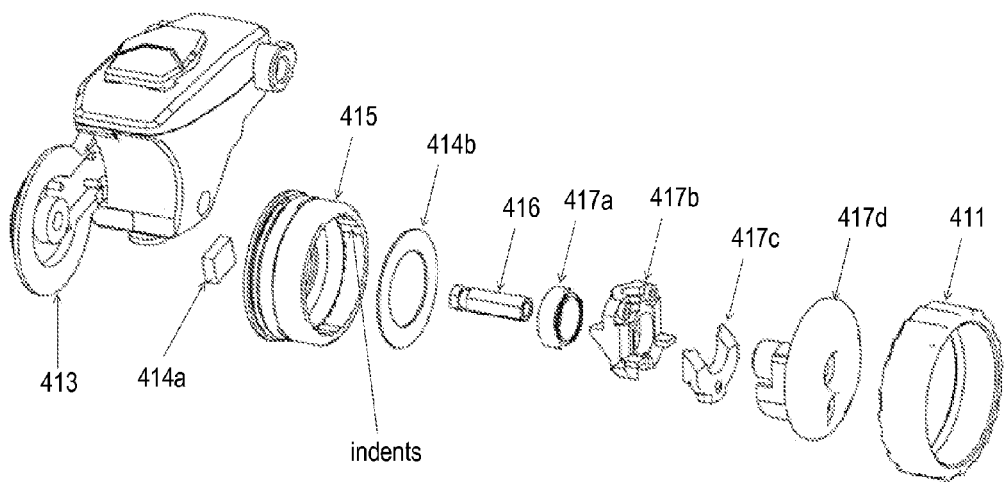
FIG. 4C depicts an exploded view of sub-components of a wheel component.

Attention is now turned to FIG. 4C, which depicts an exploded view of sub-components of the wheel component 410 from FIG. 4B once disassembled. The sub-components include, from left to right, a pivot arm 413, an encoder 414a, a wheel barrel 415, an encoder wheel code 414b, a shaft 416, a ball bearing detent 417a, a detent 417b, a detent spring 417c, a detent spring 417d cover, and a wheel cover 411.

Figure 4D:
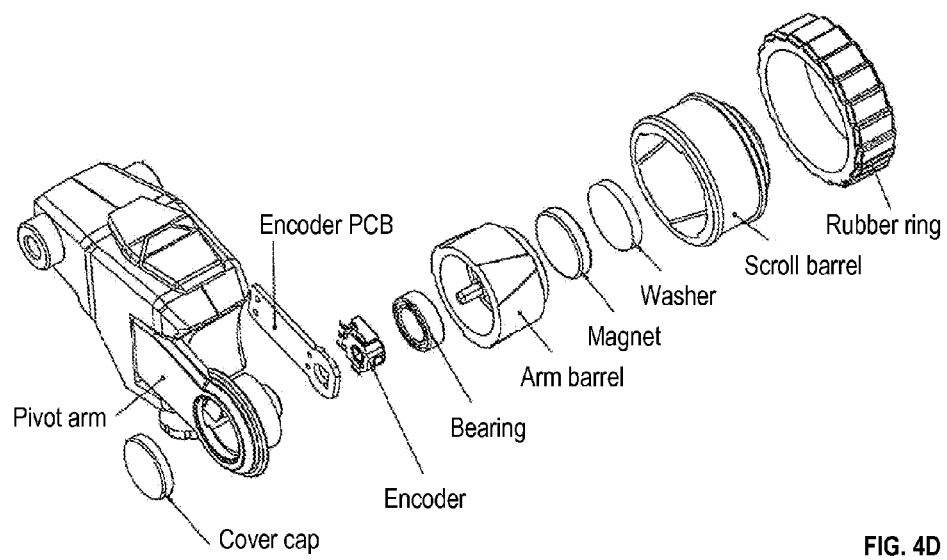
FIG. 4D depicts an exploded view of sub-components of another wheel component.

Attention is now turned to FIG. 4D, which depicts an exploded view of sub-components of another wheel component. The sub-components include, from left to right, a cover cap, a pivot arm, an encoder printed circuit board, an encoder, a bearing, an arm barrel, a magnet, a washer, a scroll barrel and a rubber ring. As shown, the rubber ring and the washer are mounted to the scroll barrel. The scroll barrel and the arm barrel couple to each other via the washer and the magnet, or via other fastening components. A tapered keyway locks the scroll barrel and the arm barrel to prevent rotation of the scroll barrel without simultaneous rotation of the arm barrel. The arm barrel is mounted on the bearing that is fixed to the pivot arm. Movement of the barrels is detected by a digital rotary encoder. It is noted that scroll barrels of different outer diameters may be used to accommodate different rubber rings.

Other wheel components with other sub-components are contemplated. For example, a reflective optical sensor may replace the encoder, and an etched plate may be connected to a barrel such that the optical sensor senses the etchings of the plate when a barrel rotates, and the sensed inputs are translated to commands. Different types of etchings may be used (e.g., etchings with deviations in thickness, depth, lines, lighting or other forms of contrast that can be detected by a sensor). A user may even create the etchings to further enhance that user's experience when using a mouse that incorporates the optical sensor and those etchings.

Pivoting Feature

Figure 4E:
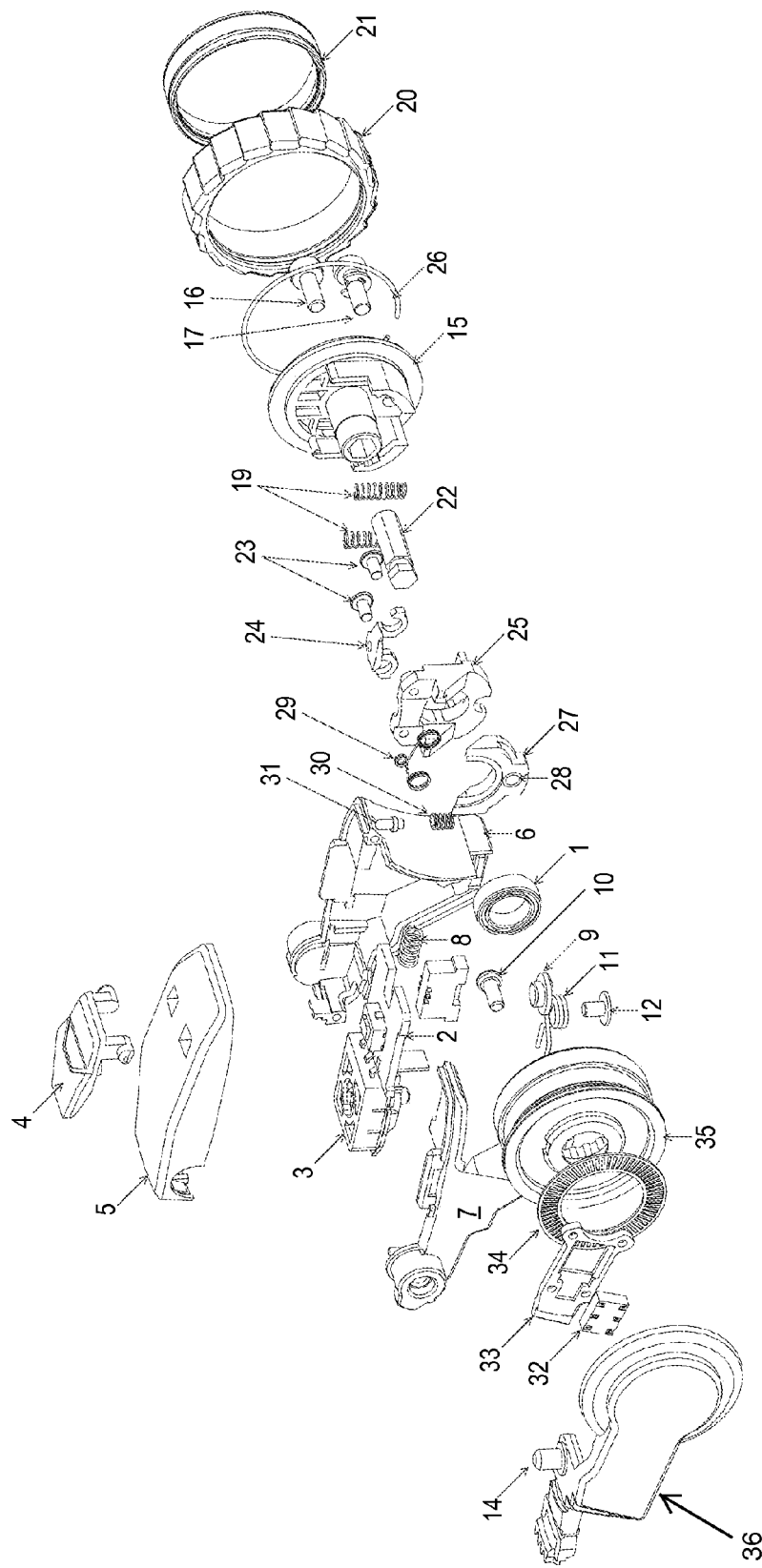
FIG. 4E through FIG. 4F depict exploded views of sub-components of both a wheel component and an arm component.
Figure 4F:
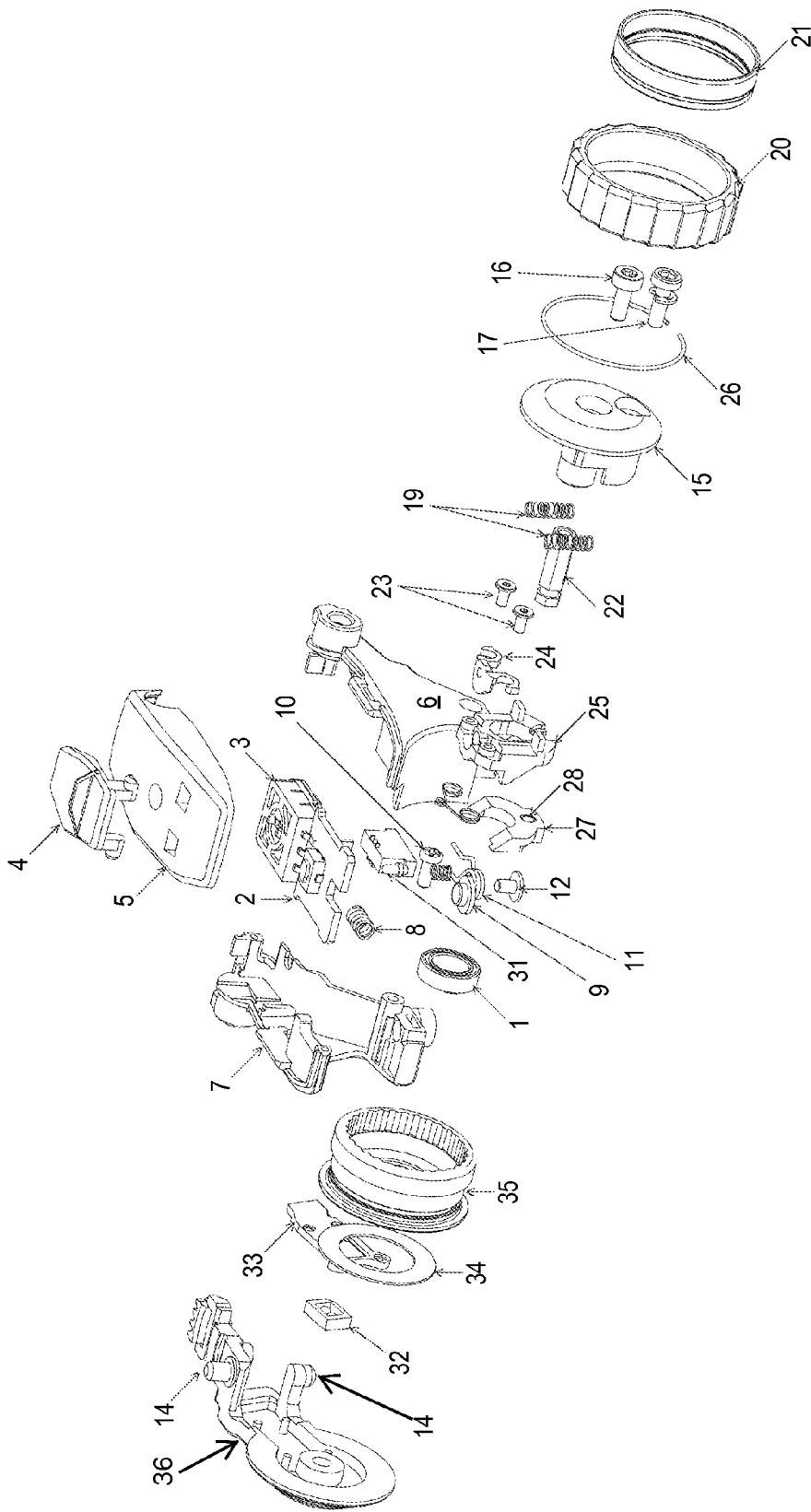

FIG. 4E and FIG. 4F depict exploded views of an assembly with sub-components of a wheel component and an arm component.

The assembly shown in FIG. 4E and FIG. 4F includes a captive bearing to promote smooth rolling (1), a PCB (2), a potentiometer that reads rotational movement of a swing arm (3), a DPI switch (4), a top housing portion (5), a left housing portion (6), a right housing portion (7), a return to position for scroll wheel push button (8), a carrier magnet (9), a pan head (10), a strafe/swing arm return to position (11), a fastener (12), a pin (13), pivot parts of a swing arm for insertion into corresponding cavities of the housing portions that allow for pivoting of the swing arm in relation to left and right movements like those shown in FIG. 2A through FIG. 2C (14), a detent spring cover (15), a head (16), an adjustable fastener manipulated by a user to adjust detent force (17), a ring (18), a detent spring used to hold detent spring bracket in tension and in position when adjusted (19), a wheel cover (20), a thermoplastic retaining ring used to hold the wheel cover in position using a physical 'interference' fit method (21), a shaft to which other parts are assembled and that receives a cover retaining fastener (22), a detent bracket retaining fastener (23), a detent cover (24), a detent that coverts turning force into vertical travel to adjust displacement of scroll sprint (25), a spring ring (26), a detent spring bracket that coverts turning force into vertical travel to adjust displacement of scroll sprint (27), a nut (28), a scroll spring (29), a detent spring (30), a detent pin which provides a physical feeling of a detent (31), an encoder that optically detects movement of a scroll wheel in conjunction with a scroll wheel encoder point of reference (32), an encoder PCB cover (33), a scroll wheel encoder point of reference that contains detents read by the encoder to determine input when the scroll wheel rotates (34), a wheel hub that holds a majority of a scroll wheel detent assembly and also provides physical detent via molded indentations on an inner surface (35), and a swing arm (36). The potentiometer (3) senses the movement of the swing arm (36), which is translated into a command (e.g., a movement of a game player to the left or right in a game environment) based on a potentiometer reading.

Palm Rest Component

Figure 5B:
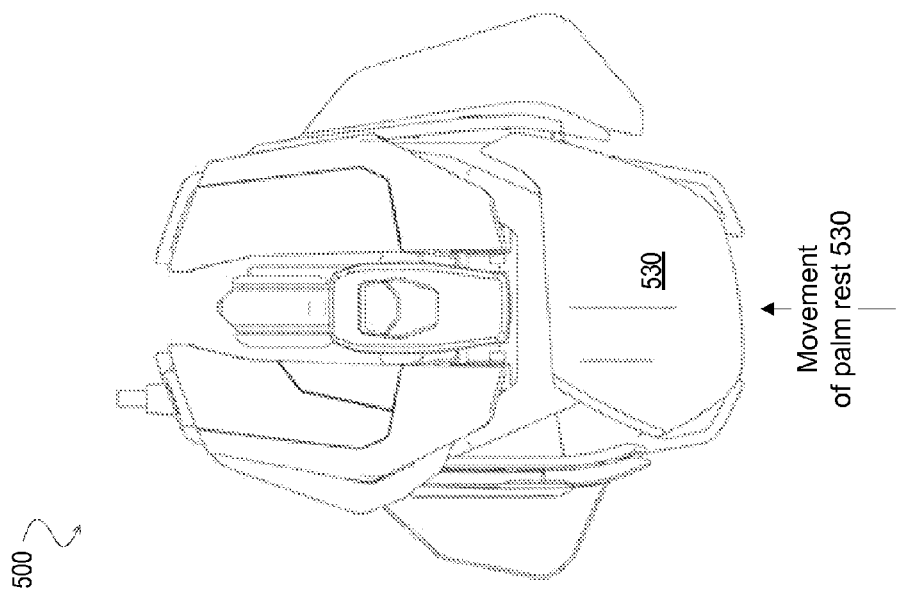
FIG. 5A through FIG. 5E depict positions of an adjustable palm rest of a mouse.
Figure 5A:
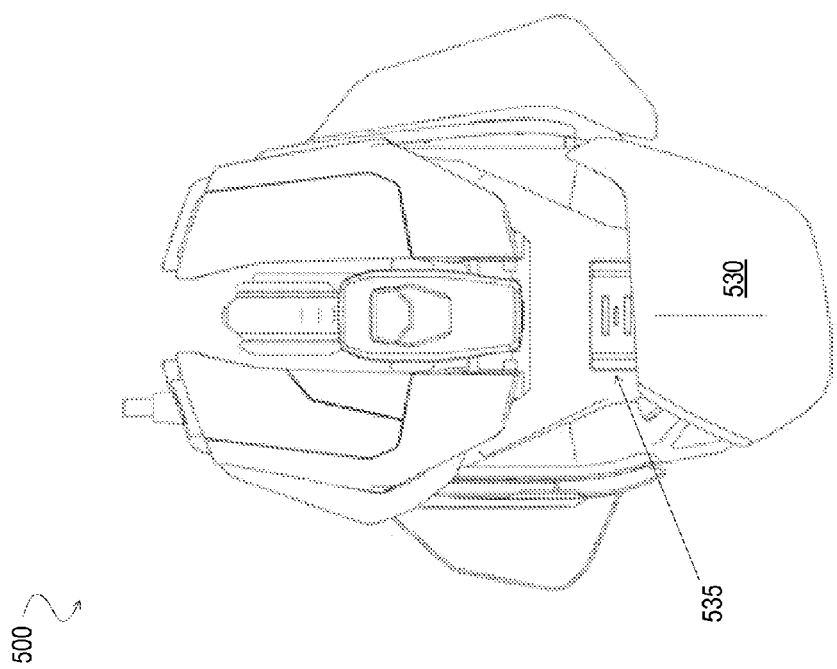
Figure 5C:
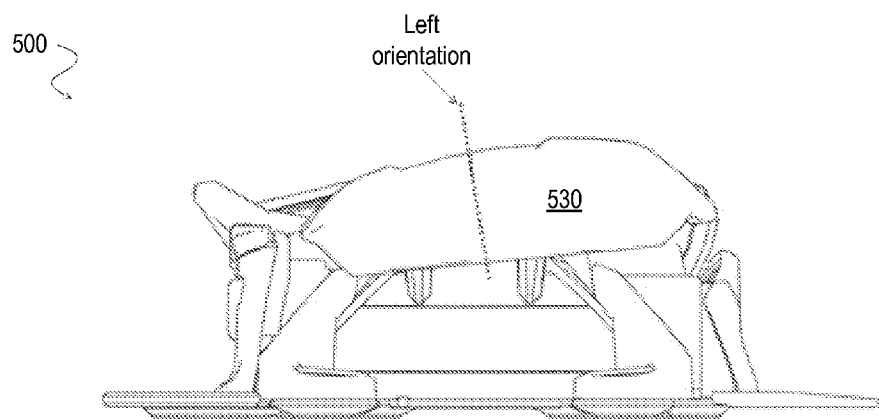
Figure 5D:
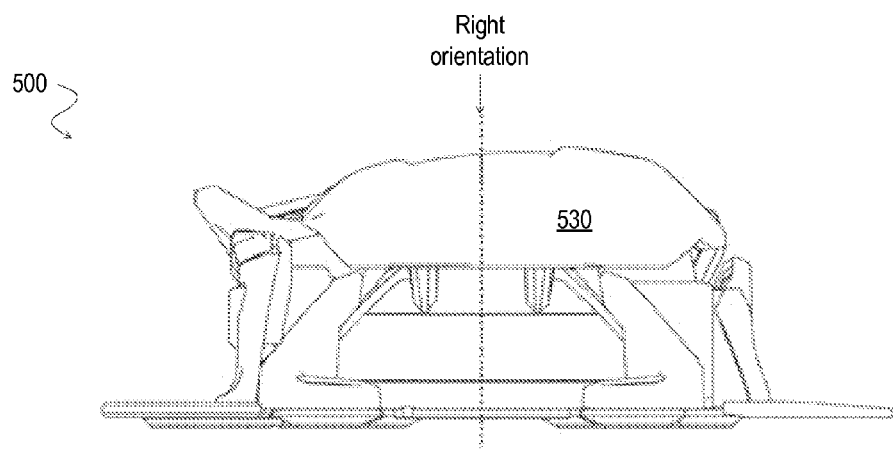
Figure 5E:
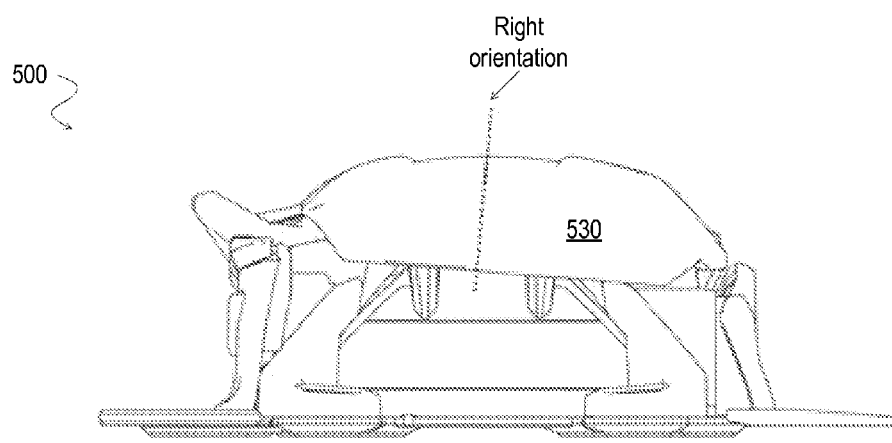

FIG. 5A through FIG. 5E depict positions of an adjustable palm rest 530 of a mouse 500. A track 535 permits the adjustable palm rest 530 to move from the position shown in FIG. 5A to the position shown in FIG. 5B. FIG. 5C through FIG. 5E show that the palm rest 530 may also tilt to a position along a left orientation (shown in FIG. 5C) from a center position along a center orientation (shown in FIG. 5D), and also tilts to a right position along a right orientation (shown in FIG. 5E) from the center position along the center orientation (shown in FIG. 5D).

Sensor Component

FIG. 6A through FIG. 6E depict a mouse 600 with a cavity for receiving a detachable sensor component 640, and also depict different detachable sensor components 640c-e that may be inserted into the cavity of the mouse 600.

Figure 6A:
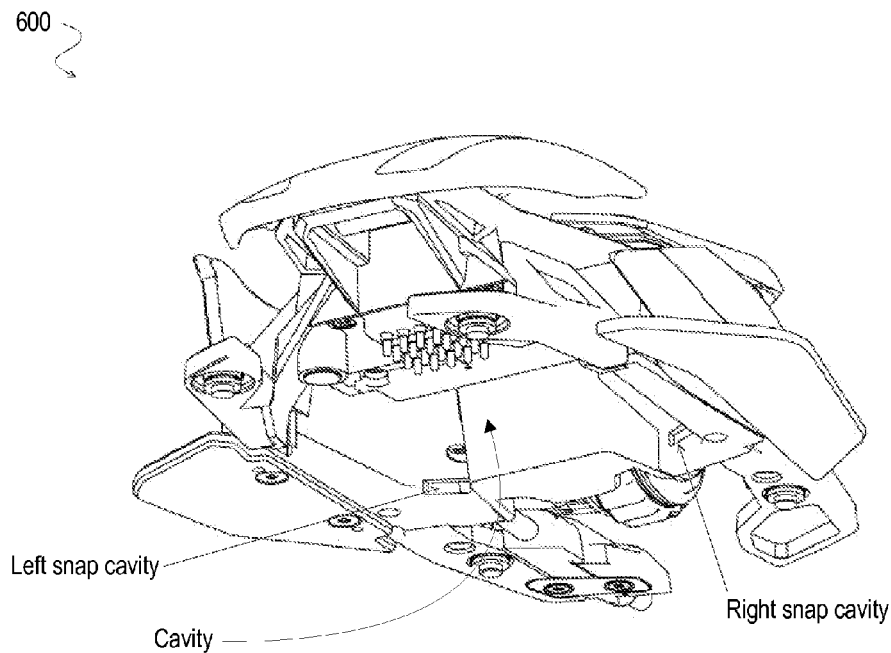
Figure 6B:
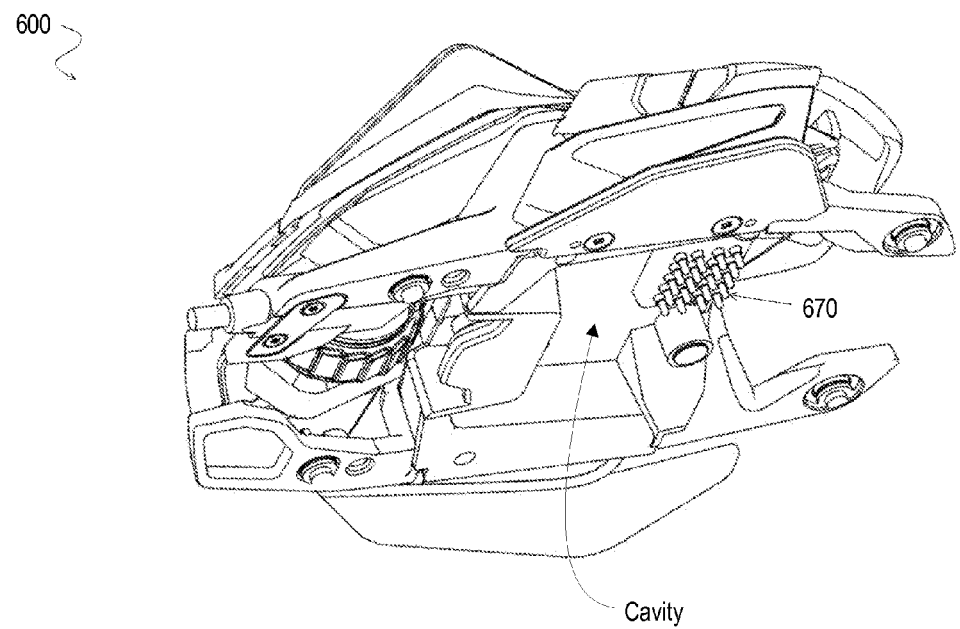

In FIG. 6A and FIG. 6B, the mouse 600 is shown to include a set of pins 670 that are positioned to make physical contact with corresponding set of pin ports of a detachable sensor component (not shown) to thereby enable electrical connectivity between the mouse 600 and the detachable sensor component.

FIG. 6C through FIG. 6E each depict an exploded view of different detachable sensor components 640c-e. Each of the sensor components 640c-e from FIG. 6C through FIG. 6E includes a top layer 641 and one of the bottom layers 642c-e that enclose one of the sensor circuit layers 643c-e. The sensor circuit layers 643c-e may each include a sensor, a printed circuit board, and/or a microcontroller unit. The same top layer 641, which includes a set of pin ports 647 that mate with the set of pins 670 shown in FIG. 6A and FIG. 6B, is used in each of FIG. 6C through FIG. 6E. Of course, different top layers may be used. The bottom layers 642c-e each include a different opening 645c-e through which a sensor of the sensor circuit layers 643c-e senses movement of the mouse 600 once the sensor component 640 is installed into the cavity of the mouse 600. FIG. 6C also shows gliders 644 that help the mouse 600 slide over a working surface when in use.

FIG. 6A and FIG. 6C also show snap cavities of the mouse 600 and corresponding snap tongues on the sensor component 640c that couple to each other to hold the sensor component 640c in place when it is inserted into the cavity of the mouse 600. Of course, fastening screws and corresponding holes could be used instead of these snap features.

FIG. 6D also shows a snap cavity of the top layer 641 and a snap tongue of the bottom layer 642d that couple to each other to join the top layer 641 and the bottom layer 642d. Of course, fastening screws and corresponding holes could be used instead of these snap features.

Each of the sensor components 640c-e may couple to the mouse 600 by snapping into the cavity, by receiving fasteners that are also received by the mouse 600, or by other means known in the art.

Figure 7A:
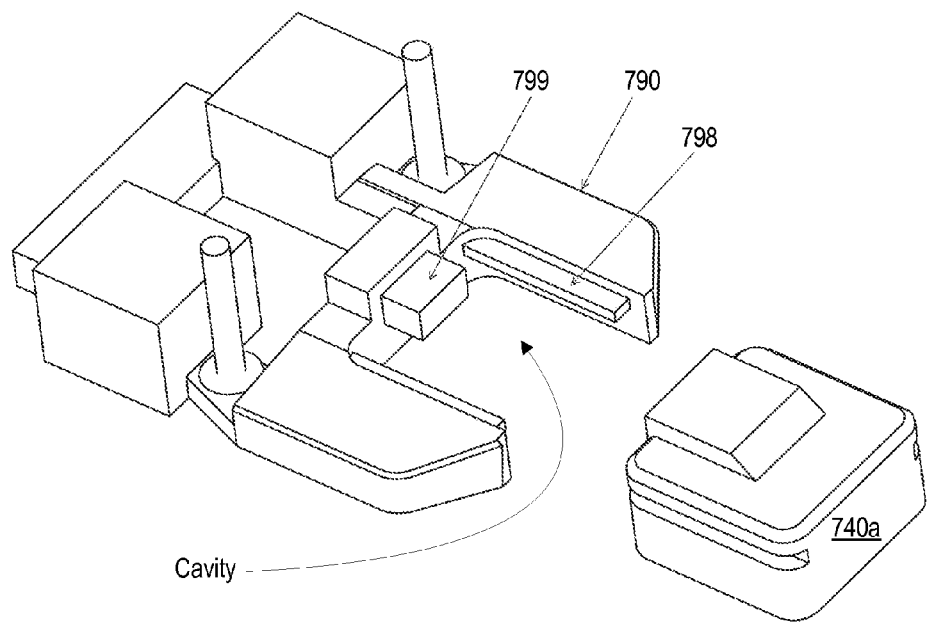
FIG. 7A through FIG. 7D depict detachable sensor components of a mouse.
Figure 7B:
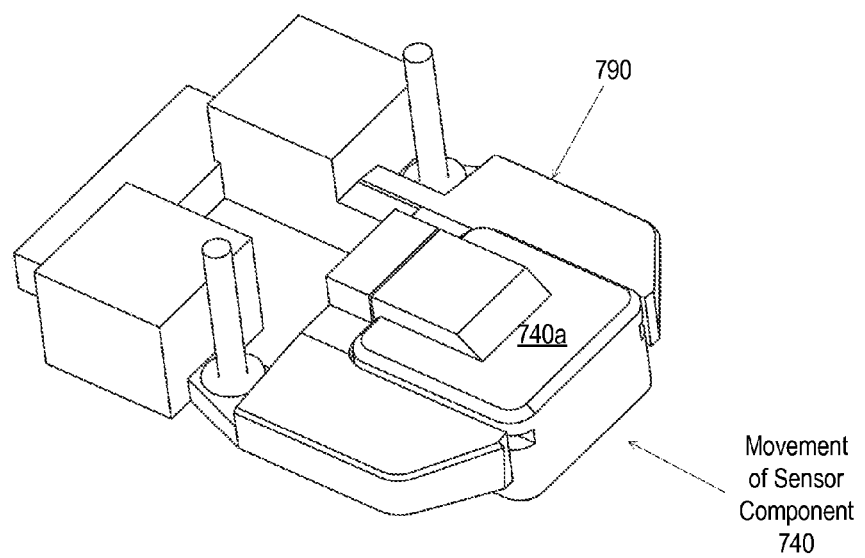
Figure 7C:
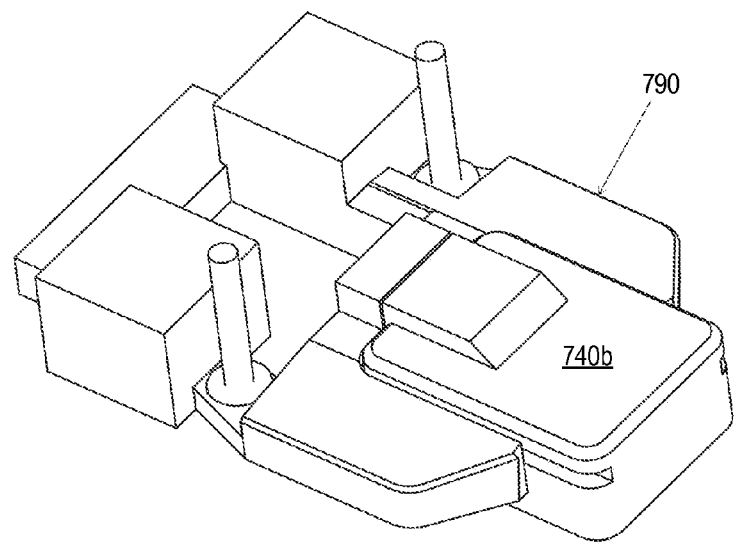
Figure 7D:
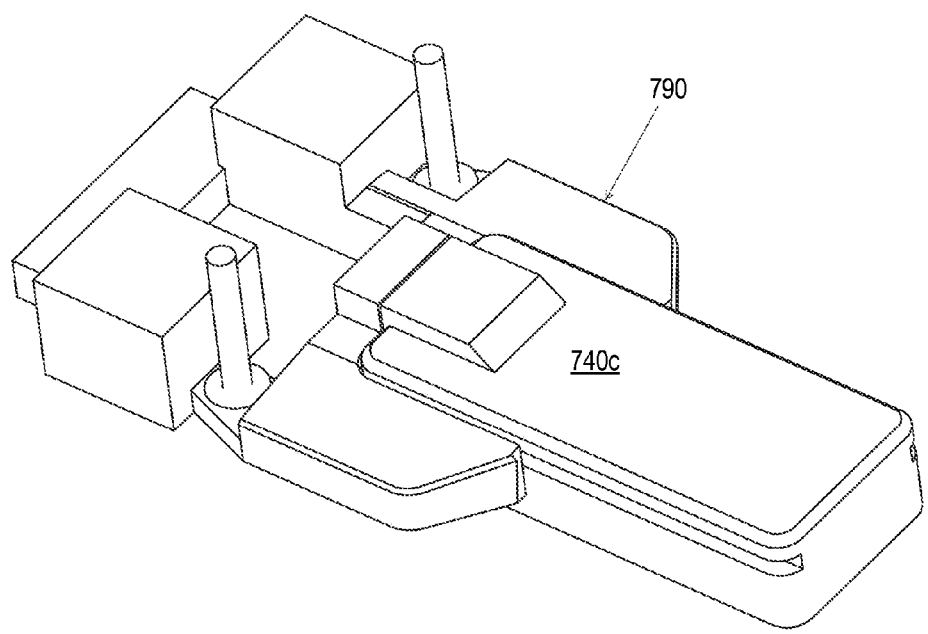

FIG. 7A through FIG. 7D depict detachable sensor components 740a-c of different sizes that are inserted into a cavity of a base component 790 of a mouse. Movement of the sensor component 740a is shown in FIG. 7A and FIG. 7B. As shown, the base component 790 includes a tongue 798 and a dock 799 that mate with corresponding cavities of the sensor component 740a.

Various sensors are contemplated, including laser and optical sensors. Different users may also desire different sensor parameters, including a specific dots per inch ("DPI" or "dpi"), acceleration, angle snapping (also known as prediction or drift control), polling rate/response time, ultrapolling, lift/liftoff distance and other parameters that can be adjusted using different sensor components. The detachable sensor components and cavity shown in FIG. 6A through FIG. 6E permit the same mouse to be used with different sensor components that include different sensors or that have different sensor parameters. The same is true of FIG. 7A through FIG. 7D.

Lift Component

Figure 8A:
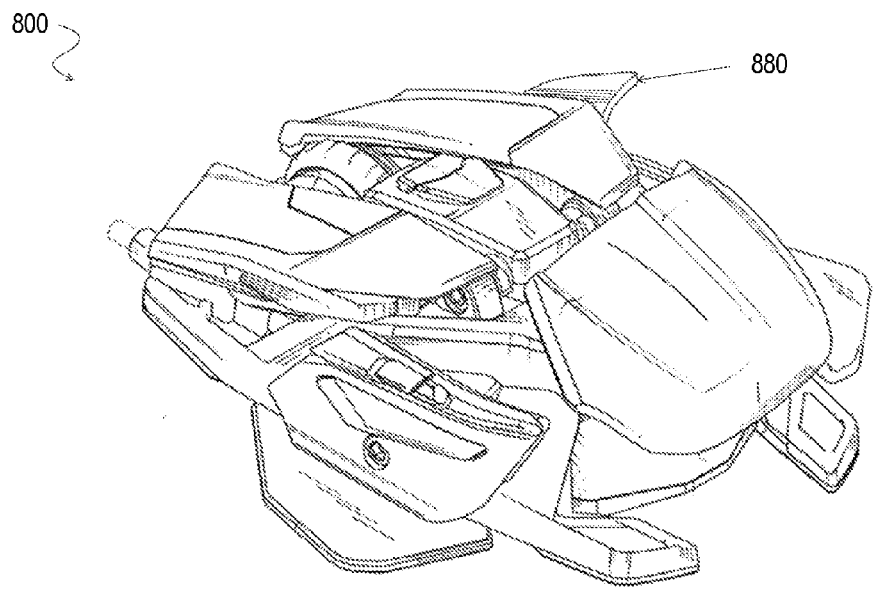
FIG. 8A through FIG. 8H depict views of lift components that form part of a mouse.
Figure 8B:
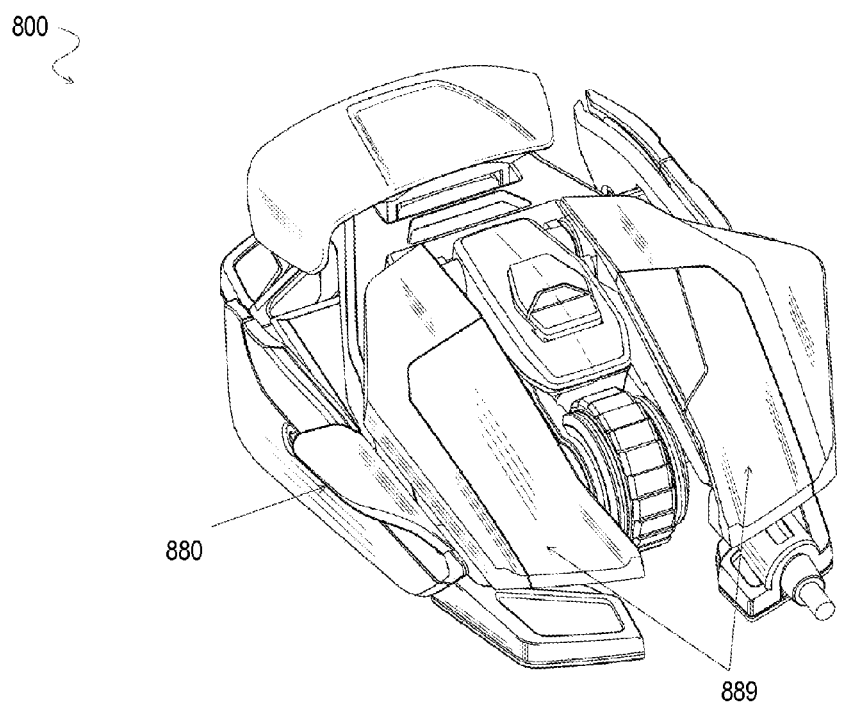
Figure 8C:
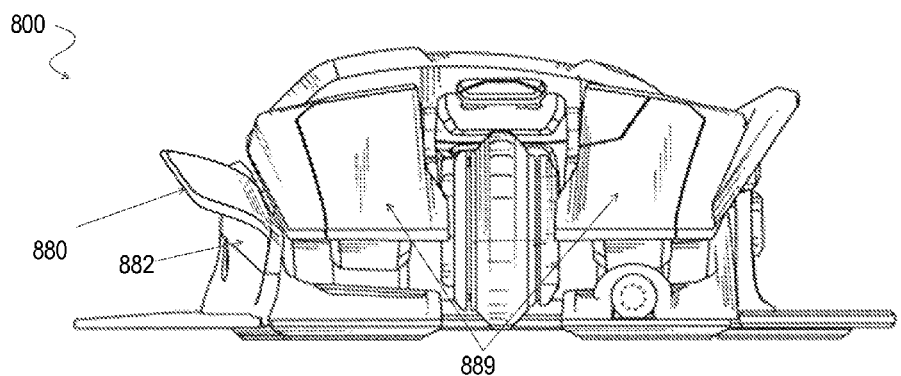
Figure 8D:
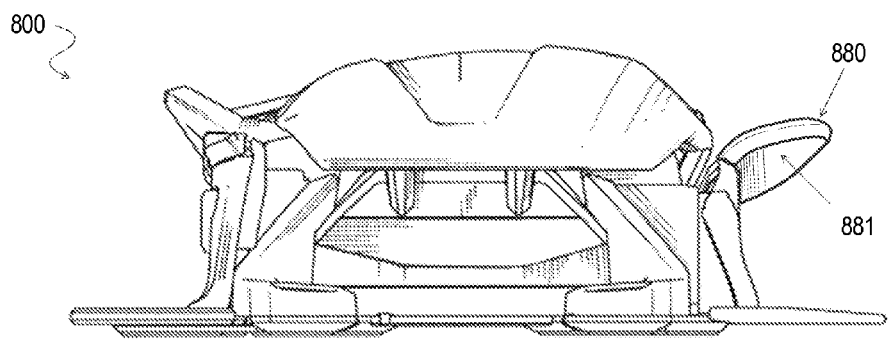
Figure 8E:
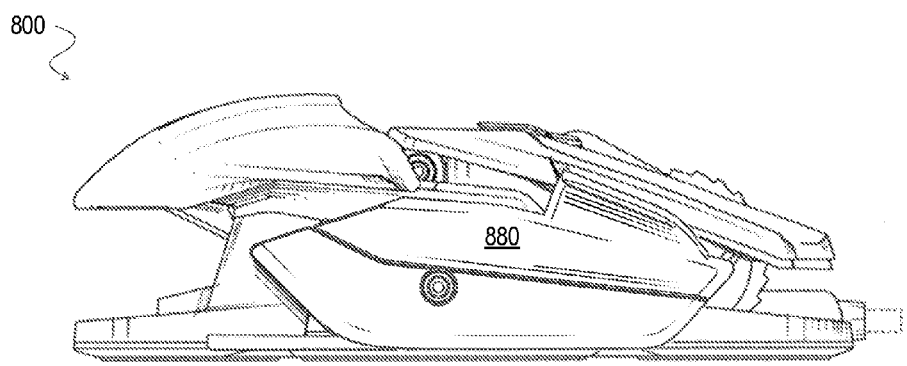

FIG. 8A through FIG. 8E depict views of a lift component 880 of a mouse 800. The lift component 880 may be detachable or fixed to the mouse 800. As shown in FIG. 8D, the lift component 880 includes an underside surface 881 that makes contact and rests on a user's finger or thumb when the user wishes to lift the mouse 800. As shown in FIG. 8C, the lift component 880 includes a side surface 882 that may also make contact and frictionally couple to a user's finger or thumb when the user wishes to lift the mouse 800.

Figure 8F:
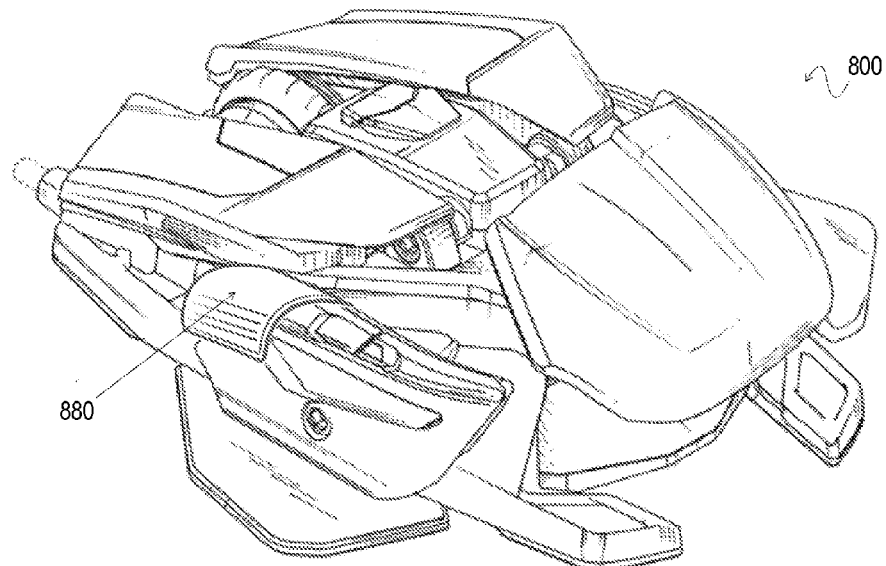
Figure 8G:
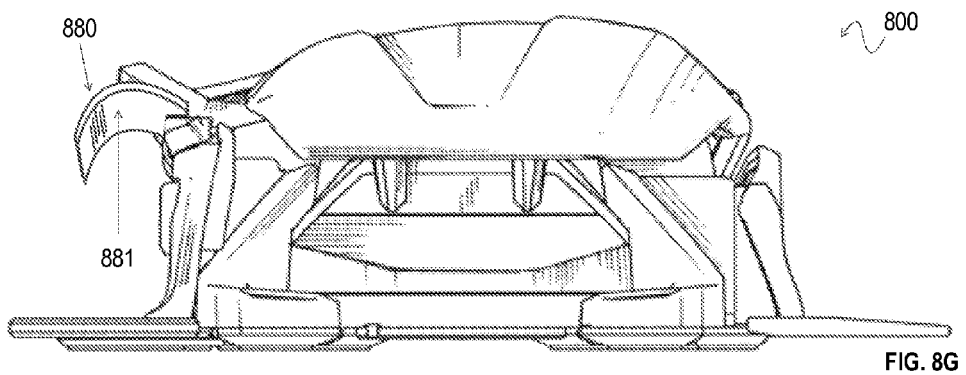
Figure 8H:
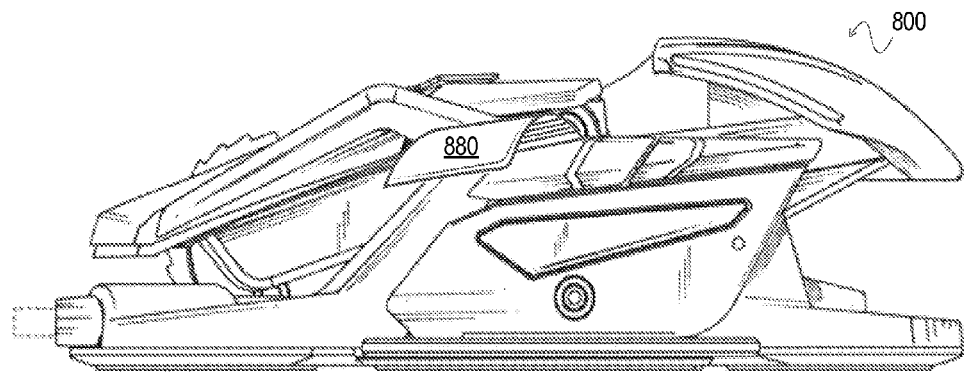

FIG. 8F through FIG. 8H depict views of another lift component 880 of a mouse 800. The lift component 880 may be detachable or fixed to the mouse 800. As shown in FIG. 8G, the lift component 880 includes an underside surface 881 that makes contact and rests on a user's thumb or finger when the user wishes to lift the mouse 800.

The positions of the lift components 880 relative to other features of the mice 800 are merely examples of two possible positions. It is to be understood that the lift component 880 may be placed at any location that could come in contact with any finger or thumb of a user without requiring the user to move his or her finger or thumb from their typical positions during use of the mouse 800. For example, a similar lift component 880 could be placed above any of the locations designated by 889 to make contact with fingers that are typically place at those locations while a user is using the mouse 800.

The size and dimensions of the lift components 880 are only examples of possible sizes and dimensions, which can vary depending on the implementation of the lift components 880 such that a user may select from different sizes and dimensions to further customize the mice 800 and enhance that user's experience.

Other Aspects

By way of example, not by way of limitation, system(s) or other means may include a mouse configured to be used as a user interface with a computing device, the mouse comprising: an arm component; a body component coupled to a first part of the arm component; and a wheel component coupled to a second part of the arm component.

In accordance with some aspects, the arm component rotates about an axis located where the first part of the arm component is coupled to the body component.

In accordance with some aspects, the arm component rotates about an axis between a first position and a second position, the wheel component is partially covered when the arm component is at the first position, and the wheel component is fully uncovered when the arm component is at the second position In accordance with some aspects, the wheel component rotates about an axis located where wheel component is coupled to the first part of the arm component.

In accordance with some aspects, the arm component rotates about a first axis located where the first part of the arm component is coupled to the body component, and the wheel component rotates about a second axis located where wheel component is coupled to the first part of the arm component. In accordance with some aspects, the first axis is perpendicular to the second axis.

In accordance with some aspects, the wheel component or the arm component includes a height adjustment sub-component that adjusts the height of the wheel component relative to a bottom of the mouse from a first height to a second height.

In accordance with some aspects, the wheel component includes a wheel bracket and a force adjustment component that adjusts an amount of force required to rotate the wheel bracket.

In accordance with some aspects, the wheel component includes an optical encoder.

In accordance with some aspects, the wheel component includes: a detachable wheel cover with a first type of outer surface texture; and a wheel bracket of a diameter that is compatible with the detachable wheel cover and at least one wheel cover with a second type of outer surface texture.

In accordance with some aspects, the wheel component moves down from a center position when a downward pressure is applied by a user, moves left from the center position when a leftward pressure is applied by the user, and moves right from the center position when a rightward pressure is applied by the user.

In accordance with some aspects, the first part and the second part are at opposite ends of the arm component.

In accordance with some aspects, the mouse further comprises: a docking cavity sized to receive different sensor sub-assemblies with different types of sensors.

In accordance with some aspects, the mouse further comprises: a sensor sub-assembly that includes a first type of sensor, wherein the sensor sub-assembly also includes a top component and a bottom component, wherein the first type of sensor is disposed between the top component and the bottom component.

In accordance with some aspects, the docking cavity is sized to receive at least two sensor sub-assemblies, each with a different type of sensor.

In accordance with some aspects, the mouse further comprises: at least two sensor sub-assemblies, each with a different type of sensor.

In accordance with some aspects, a first sensor sub-assembly of the at least two sensor sub-assemblies includes a laser sensor, and a second sensor sub-assembly of the at least two sensor sub-assemblies includes an optical sensor.

In accordance with some aspects, the at least two sensor sub-assemblies have different sensors of different sizes.

In accordance with some aspects, the mouse further comprises: a docking pin connector disposed to connect with a corresponding sub-assembly pin connector of a detachable sensor sub-assembly that is sized to be inserted into the docking cavity.

In accordance with some aspects, the docking cavity includes a docking pin connector disposed to connect with two or more pin connectors of two or more corresponding sensor sub-assembly at different times.

In various figures, wheel components and arm components are shown as separate components; however, it is noted that a single component may be formed to include the wheel component and the arm component such that the resultant single component has the features of the wheel component and the arm component. It is also noted that, in some embodiments, the strafing movement described in relation to the wheel component is carried out by moving the arm component.

It is noted that output associated with pivoting movement of the wheel component may be analog or digital.

It is noted that features of embodiments described above in relation to a mouse may extend to other user interfaces, including joy sticks, keyboards, game controllers and other human operated devices for interfacing with computers.

Functionality and operation disclosed herein (e.g., interpretation of inputs as commands) may be embodied as one or more methods implemented, in whole or in part, by machine (s)—e.g., computing component(s), or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more computing components cause the computing components to carry out the method(s). A computing component may include, or be included within, a processor, a computing device like a computer, a controller, an integrated circuit, a "chip", a system on a chip, a server, other programmable logic devices, other circuitry, or any combination thereof. All of the inputs disclosed herein may be represented by data, and that data may be transmitted over any communication pathway using any protocol, stored on a data source, and processed by a computing component.

The words comprise, comprising, include, including and the like are to be construed in an inclusive sense (i.e., not limited to) as opposed to an exclusive sense (i.e., consisting only of). Words using the singular or plural number also include the plural or singular number, respectively. The words or or and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment. This disclosure is not intended to be limited to the aspects shown herein but is to be accorded the widest scope understood by a skilled artisan, including equivalents.

The invention claimed is:

1. A mouse configured to be used as a user interface with a computing device, the mouse comprising:
   an arm component having a first part coupled to a body component, and further having a second part coupled to a wheel component,
   wherein the arm component rotates about an axis located where the first part of the arm component is coupled to the body component,
   wherein the arm component rotates about an axis between a first position and a second position,
   wherein the wheel component is partially covered when the arm component is at the first position, and
   wherein the wheel component is fully uncovered when the arm component is at the second position.

2. The mouse of claim 1, wherein the wheel component rotates about an axis located where wheel component is coupled to the first part of the arm component.

3. The mouse of claim 2, wherein the first axis is perpendicular to the second axis.

4. The mouse of claim 1, wherein the wheel component or the arm component includes a height adjustment sub-component that adjusts the height of the wheel component relative to a bottom of the mouse from a first height to a second height.

5. The mouse of claim 1, wherein the wheel component includes a barrel and a force adjustment component that adjusts an amount of force required to rotate the barrel.

6. The mouse of claim 1, wherein the wheel component includes an optical encoder.

7. The mouse of claim 1, wherein the wheel component includes:
   a detachable wheel cover with a first type of outer surface texture; and
   a barrel of a diameter that is compatible with the detachable wheel cover and at least one wheel cover with a second type of outer surface texture.

8. The mouse of claim 1, wherein the wheel component moves down from a center position when a downward pressure is applied by a user, moves left from the center position when a leftward pressure is applied by the user, and moves right from the center position when a rightward pressure is applied by the user.

9. The mouse of claim 1, wherein the first part and the second part are at opposite ends of the arm component.

10. The mouse of claim 1, wherein the mouse further comprises:
    a docking cavity sized to receive different sensor sub-assemblies with different types of sensors.

11. The mouse of claim 10, wherein the mouse further comprises:
    a sensor sub-assembly that includes a first type of sensor, wherein the sensor sub-assembly also includes a top component and a bottom component, wherein the first type of sensor is disposed between the top component and the bottom component.

12. The mouse of claim 10, wherein the docking cavity is sized to receive at least two sensor sub-assemblies, each with a different type of sensor.

13. The mouse of claim 10, wherein the mouse further comprises:
    at least two sensor sub-assemblies, each with a different type of sensor.

14. The mouse of claim 13, wherein a first sensor sub-assembly of the at least two sensor sub-assemblies includes a laser sensor, and a second sensor sub-assembly of the at least two sensor sub-assemblies includes an optical sensor.

15. The mouse of claim 13, wherein the at least two sensor sub-assemblies have different sensors of different sizes.

16. The mouse of claim 10, wherein the mouse further comprises:
    a docking pin connector disposed to connect with a corresponding sub-assembly pin connector of a detachable sensor sub-assembly that is sized to be inserted into the docking cavity.

17. The mouse of claim 10, wherein the docking cavity includes a docking pin connector disposed to connect with two or more pin connectors of two or more corresponding sensor sub-assembly at different times.

* * * * *